July 16, 1935.  J. BIJUR  2,007,960

LUBRICATING INSTALLATION

Filed March 17, 1928  4 Sheets-Sheet 2

INVENTOR
Joseph Bijur.
BY
Dean, Fairbank, Obright & Hirsch
his ATTORNEYS.

July 16, 1935.  J. BIJUR  2,007,960
LUBRICATING INSTALLATION
Filed March 17, 1928  4 Sheets-Sheet 3

INVENTOR
Joseph Bijur
BY
Dean, Fairbank, Obrieght & Hirsch
his ATTORNEYS.

July 16, 1935.  J. BIJUR  2,007,960

LUBRICATING INSTALLATION

Filed March 17, 1928  4 Sheets-Sheet 4

Patented July 16, 1935

2,007,960

UNITED STATES PATENT OFFICE 2,007,960

LUBRICATING INSTALLATION

Joseph Bijur, New York, N. Y., assignor to Auto Research Corporation, a corporation of Delaware Application March 17, 1928, Serial No. 262,364

64 Claims. (Cl. 184—7)

My present invention is concerned primarily with central lubricating systems, for example for the chassis of automobiles, although it may be applied in other analogous relations.

It is an object of the invention to provide a system of the above type, embodying simple and inexpensive parts, which, without attention other than replenishing the supply of lubricant from time to time, shall automatically, and throughout operation, apply lubricant to the bearings, in accordance with the respective requirements thereof.

Another object is to provide an installation of the above type, which shall arrest lubricant flow or leak during idle periods, and which shall at all times prevent the seepage of any water as from the bearing hangers into the contiguous wear surfaces, and which shall further prevent the entry of dirt, dust or water into the supply of lubricant.

Another object is to utilize as the propelling agency for a system of the foregoing type, the motive force of an elastic fluid medium, such as air, subjected to pressure as by the application of heat from a part, such as the exhaust manifold of the operating engine, and in which the possible difficulties are obviated, due to incidentally cooking the oil while heating the expansive medium.

Another object is to automatically restore the initial or basic pressure conditions of the propulsive medium regardless of the length of the previous operation, or the volume of oil that had been forced out of the lubricant reservoir in the expansion of the motive fluid.

Another object is to provide an installation of the above type in which the propulsive pressure is varied to compensate for increased viscosity of lubricant in cold weather, but is at all times kept within safe limits.

Another object is to provide an installation of the above character, embodied in a distributing system of the type having calibrated high-resistance valveless outlets, in which the oil supply may be automatically sealed from the distributing piping as a safeguard against leak during idle periods, and in which substantially the full motive power of the expansive medium is nevertheless applied to overcome the frictional resistance in the distributing system.

A feature of the invention is the use of thermostatic means to limit the temperature of the main or of a service lubricant reservoir, mounted at a hot part of the mechanism. Another feature is the use of automatic compensating means, preferably associated with the thermostat, to allow a greater rise of temperature in winter than in summer, in order to increase the pressure in accordance with the higher resistance to flow due to increase with cold in the viscosity of the lubricant. In lieu of temperature compensation, pressure compensation may be accomplished by a relief valve for the expansive medium, set for a higher pressure in winter than in summer, and venting to atmosphere.

Where the main lubricant container is subjected directly to the pressure of the expansive medium, the vacuum due to the contraction of such medium after stopping the engine, is satisfied according to my invention, by drawing air from the exterior, preferably through a valve protected by an air cleaner. Where the propulsive pressure is applied to a service reservoir fed from a distinct main reservoir, the vacuum due to contraction of the hot expansive medium, is satisfied by the flow of a fresh charge of lubricant from the main to the service reservoir.

Another feature is the provision of a spring-seated check valve at the inlet to the distributing piping, said valve provided with a jiggle weight which may be a long heavy shank, so that the system is effectively sealed when the engine is out of operation, but the valve will oscillate under the vibration of the moving vehicle, to pass lubricant into the distributing piping without the loss of effective pressure from the expansive medium in overcoming said check valve.

In a desirable simple construction, the service reservoir may be in the form of a stand pipe having a closed upper end in effective heat interchange relation with the exhaust manifold or other heated part of the engine. The upper end of the pipe may be supplied from a collar having an annular channel therein and arranged in the length of the exhaust manifold, or from a pipe longitudinally within the manifold, or from a separate chamber cast with, or welded onto the exhaust manifold.

In the accompanying drawings in which are shown one or more of various possible embodiments of the several features of the invention.

Figures 1, 2:
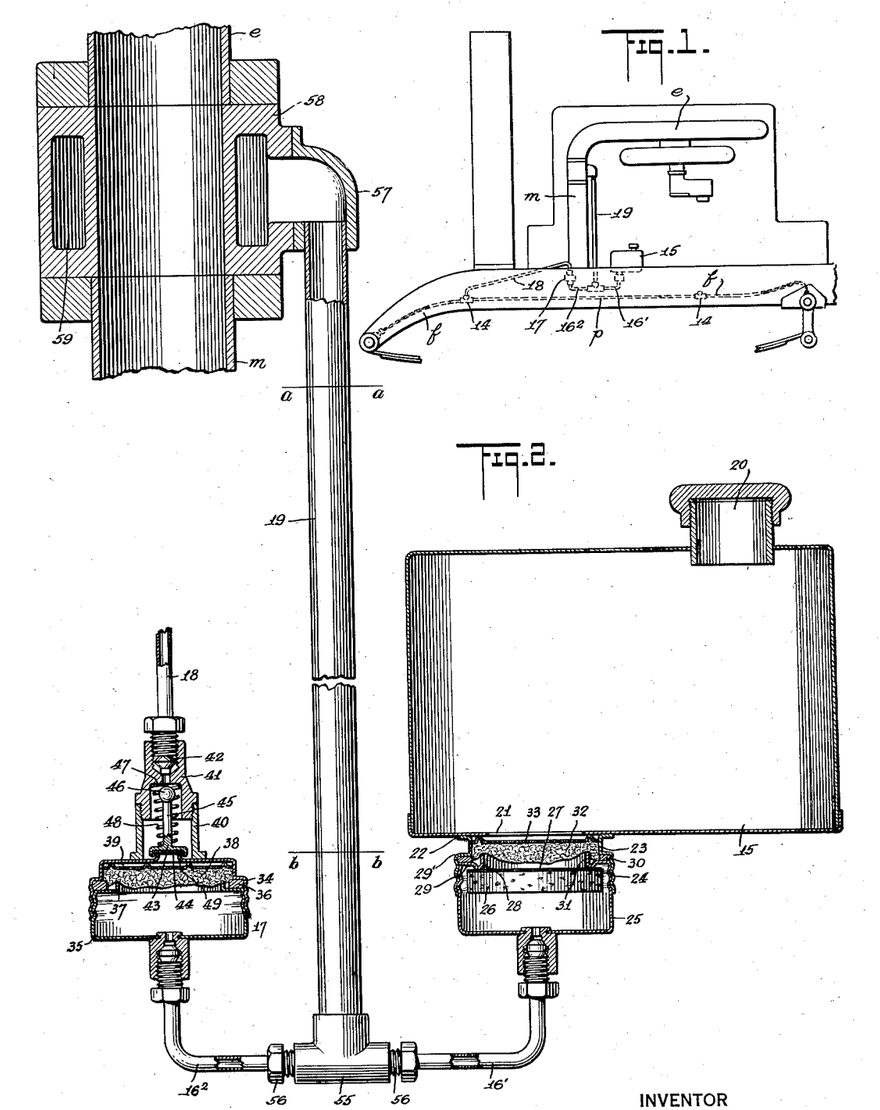
Fig. 1 is a diagrammatic view illustrating a preferred installation.
Fig. 2 is a view in longitudinal cross-section on a larger scale illustrating the construction and arrangement of the lubricant supply installation of Fig. 1.

In the drawings, I have shown diagrammatically in Fig. 1 a fragment of an installed chassis lubricating system, the lubricant propelling construction of which appears in greater detail in Fig. 2. Referring to Fig. 1 there is illustratively shown at substantially the level of the channel frame the main lubricant reservoir 15 connected by a pipe 16'—16² to an outlet unit 17 which in turn is connected by pipe 18 to the distributing piping p. The piping may lead along the lengths of the channel frames and along other structure of the vehicle, and may have outlets embodying flow control fittings f, applied at their outlet ends to the bearings to be lubricated. The fittings f are preferably of uniform length, applied at their inlets to T or junction fittings or collars 14 of the main piping. The fittings are of diverse flow resistances as hereinafter more fully described, the rating of each fitting corresponding to the lubricant requirements of the bearing to which it is connected. Details of preferred forms of flow control fittings are shown in Figs. 10 to 15 inclusive and will be described hereinafter.

A standpipe 19 rises from between the ends of connecting pipe 16'—16² and the upper end of said standpipe is in heat interchange relationship with the exhaust manifold e for propulsion of the oil, in a manner now to be described by reference to the construction shown in Fig. 2.

Referring to Fig. 2, the reservoir may be a metal vessel 15 having a filling cap 20 at its top, and an outlet opening 21 through its bottom to which is soldered at 22 the cap 23 of a capsule into which is threaded at 24 the removable base member 25 thereof. A check valve comprising a cork disk 26 faced preferably as at 27 with varnished silk, coacts with a sheet metal annular seat 28 formed as an integral part of base member 25. A gasket 30 clamped between shoulders 29 and 29' of the base 25 and cap 23 respectively renders the construction lubricant-tight.

The valve seat portion 28 has an inwardly extending flange 31 clamping the rim of a felt filter disk 32 against a ridged wire mesh backing plate 33 which in turn is thereby pressed against the bottom of the reservoir.

The outlet fitting 17 preferably comprises a capsule including a cap 34 threaded upon a base 35 with an interposed gasket 36. The upstanding inner rim 37 of the capsule exerts compression against the rim of a filter disk 38 of felt, which, as in the reservoir filter, has a ridged backing 39 of wire mesh, pressing against the top of the cap 34. An upstanding socket 40 on the cap has a plug 41 threaded therein to which is connected by means of a coupling 42 the inlet 18 of the distributing piping system. A check valve 43 is housed within the valve cage determined by the socket 40 and the plug 41. The valve 43 comprises a disk with a seating facing 44 preferably of varnished silk, and has an integral upstanding shank 45 terminating preferably in a ball weight 46 which extends into a corresponding cavity 47 in the plug 41 and is pressed by means of a coil spring 48 against a seat 49, the latter preferably formed as an integral part of cap 34. The weight serves to jiggle the valve with respect to its seat during locomotion of the vehicle, as will hereinafter be more fully described.

The standpipe 19 has a T fitting 55 at its lower end, to which are connected by couplings 56 the corresponding extremities of the connecting pipe segments 16' and 16². The standpipe is connected at its upper end to the downwardly extending elbow 57 bolted to a special collar 58 which may be connected as shown between the outlet end of the exhaust manifold e and the contiguous end of the exhaust pipe m. The collar 58 preferably has an annular channel 59 in the interior thereof communicating with the elbow outlet 57.

In operation, the hot gases passing through the exhaust pipe will heat and cause expansion of the air contained within the hollow collar 58, with consequent pressure upon the oil that has risen into the standpipe 19 from the reservoir.

The check valve 43 at the head of the distributing line is effectively urged against its seat while the vehicle is stationary, so that, (the restricted outlets being at approximately uniform level on the vehicle), no draining of the pipe contents or of the reservoir contents will occur, even though the pipe system or one of the outlet fittings thereof be defective.

Normally, while the vehicle is not in operation, lubricant from the reservoir will have risen in the standpipe to substantially the level of the line a—a, the air imprisoned in the upper end of the standpipe and in the collar, being under pressure slightly less than atmospheric to balance the column of oil above the level of that in the reservoir. This condition may be accomplished by initially exhausting sufficient air from the empty standpipe to bring about this relation. As will be hereinafter described, however, such special operation is unnecessary as the state of equilibrium set forth, will be automatically reached after a few operations of the system.

While the engine is running, the air in the chamber 59 will expand and exert pressure upon the column of lubricant in the standpipe. This pressure transmitted through the pipe segment 16' will press the cork disk valve 26 against its seat 28 and thereby prevent return flow of lubricant to the reservoir. During operation of the vehicle, the valve 43 jiggles on its seat and the pressure of the air in the standpipe will accordingly force lubricant through the outlet pipe 16² past the jiggle valve 43 and through the length of piping system to the various highly resistant outlet control fittings f which emit to the corresponding bearings.

Throughout operation of the vehicle, oil is thus continuously emitted at the extremely slow rate, which is the consequence of the high resistance outlet fittings f and the moderate expansive pressure of the imprisoned air. The standpipe 19 is of such volume that under the slow rate of oil flow the level of oil in the standpipe will not drop below the line b—b, even though the vehicle be run continuously for an entire day.

When the engine stops and the system cools, the expanded air in the collar 59 and in the upper end of the standpipe 19 will contract. The check valve 43 prevents application of the resulting suction to the distributing pipe system, and accordingly a fresh charge of oil is drawn from the main reservoir 15 past the now open check valve 26 to satisfy the vacuum, the oil rising back to substantially the level a—a in the standpipe.

The quantity of air imprisoned in the standpipe is such that under substantially atmospheric pressure, and even in the coldest weather, its volume will be such as to extend down at least to the level a—a, so that the oil will never rise into direct contact with the wall of the exhaust pipe and excessive heating or carbonization of the oil is avoided.

When the new system is initially set into operation, it will be understood that upon filling the reservoir 15, the oil would rise in the standpipe 19 only to substantially the level in the reservoir 15. In fact, it would rise to a level slightly less, since the trapped air would suffer slight compression. When the engine is now operated the air would expand down to below the T fitting 55 and some of the air would, accordingly, be expelled, so that the level of the oil upon subsequent cooling would rise higher in the standpipe and further expulsion of air would occur in subsequent operations until the condition shown in the drawings is reached.

The location shown of the main oil reservoir 15 is convenient for refilling. Moreover the oil is at such distance from the hot engine as to avoid cooking and possible carbonization. Even the oil in the standpipe, or service enclosure 19 to which the expansive force of the air is applied, is only moderately warmed, and is not raised to the boiling point.

The reservoir filter 32 intercepts any solid particles carried with the oil which might otherwise become lodged at the valve seat 28 and interfere with effective valve seating. The filter 38 at the outlet similarly protects and assures proper seating of valve 43 while the vehicle is stationary, and prevents clogging the restriction fittings f with any small particles or sludges carried by the oil. The jiggle valve 43 may have a substantial weight and a strong spring to render it effective for its purpose, and yet the moderate pressure evolved in the standpipe will not be consumed in opening said valve, since valve operation is effected by vibration as previously noted.

The installation is entirely automatic in action and requires no attention other than to refill the reservoir from time to time. The construction is simple and devoid of mechanism likely to be deranged.

Thus I have provided a lubricating system devoid of any valves that have to be overcome by the pressure generated in the reservoir. Accordingly, no definite pressure need be exceeded to open valves before flow can commence.

Figure 3:
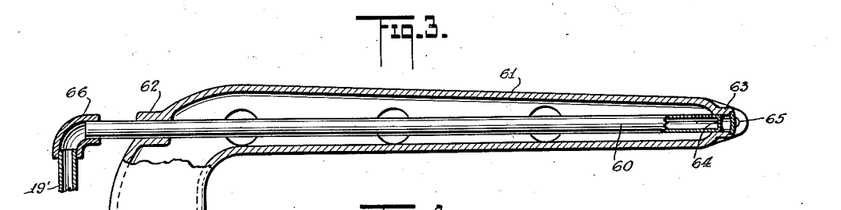
Fig. 3 is a view in longitudinal cross-section illustrating an alternative embodiment of the heat transfer connection.

In Fig. 3 is shown a modified arrangement for heating the lubricant propelling air. I have here shown a pipe 60 extending longitudinally through the exhaust manifold 61 and fitted into corresponding sockets or lugs 62 and 63 welded onto or cast as unitary parts of said manifold. The inner end of the pipe 60 is hermetically sealed as at 64 and confined by means of a Welch plug 65 in the end of the manifold. The standpipe 19' is connected to the outer end of pipe 60 by means of an elbow fitting 66.

Figures 4, 5, 10, 11, 12, 13, 14:
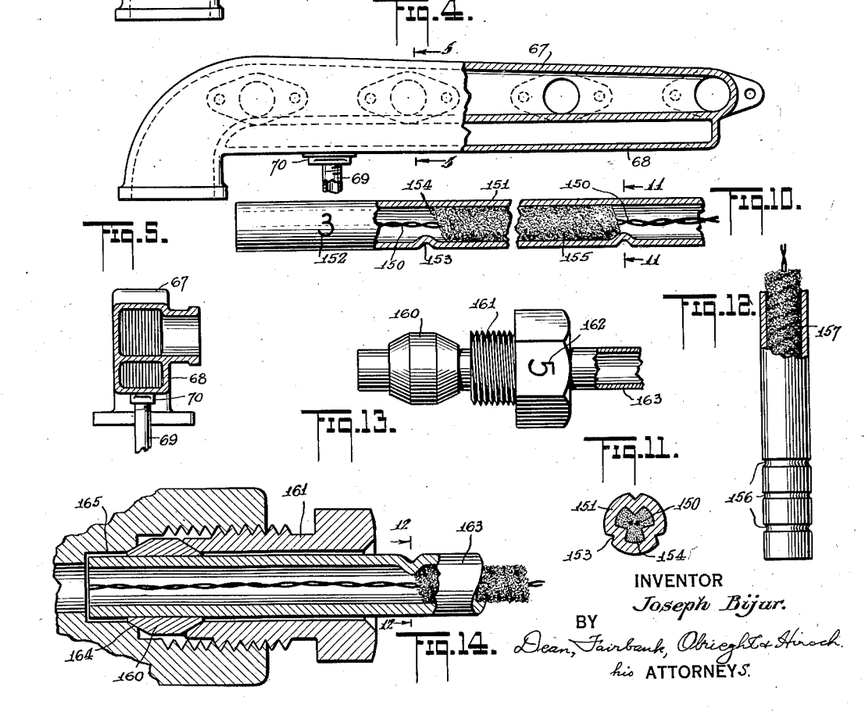
Fig. 4 is a view similar to Fig. 3 of another embodiment thereof.
Fig. 5 is a view in transverse cross-section taken on the line 5—5 of Fig. 4 of the latter embodiment.
Fig. 10 is a fragmentary detailed view in longitudinal cross-section of one embodiment of outlet fitting.
Fig. 11 is a view in transverse cross-section along line 11—11 of Fig. 10.
Fig. 12 is a view similar to Fig. 10 of a modified form of outlet fitting.
Fig. 13 is an elevation partly in section of a terminal construction for any of the fittings shown in Figs. 10, 11 and 12.
Fig. 14 is a view in longitudinal cross-section and on an enlarged scale of the applied terminal shown in Fig. 13, and, Fig. 15 is a view in transverse cross-section of another embodiment of terminal fitting.

Another alternative form is shown in Figs. 4 and 5 in which the exhaust manifold 67 is cast with a pocket 68 formed integrally therewith at the lower face thereof. The standpipe 69 may be connected at its upper end to the interior of the jacket 68 by threading into a corresponding nipple 70 cast on the jacket.

Figure 6:
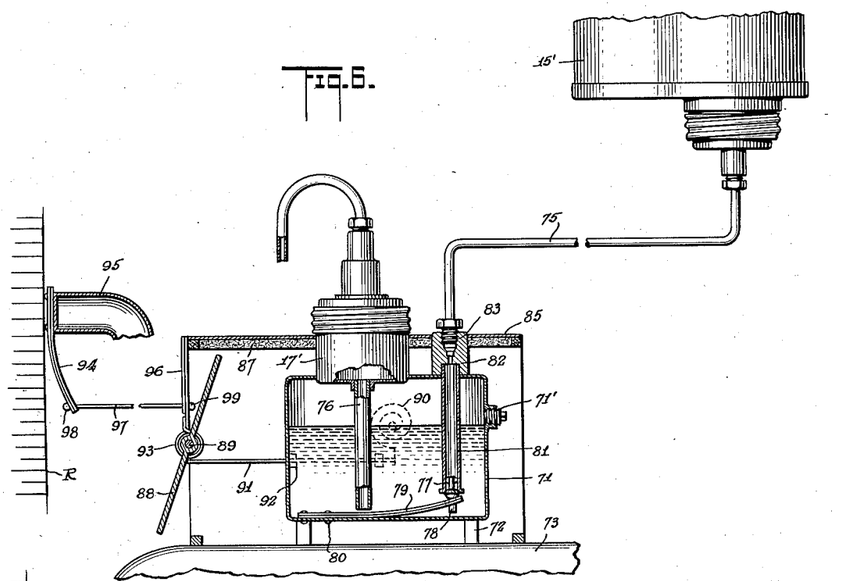
Fig. 6 is a view similar to Fig. 2 of an alternative lubricant supply installation.

In Fig. 6 is shown a modified supply installation in which the main reservoir 15' is at high level, but the service reservoir instead of being embodied in a standpipe, as in Figs. 1 and 2 takes the form of a smaller reservoir 71 at lower level charged from the main reservoir through a connector pipe 75. Service reservoir 71 is mounted illustratively upon feet 72 bolted directly upon the exhaust manifold 73. The top of the service reservoir is closed, except for the outlet unit 17' which is preferably identical with the outlet unit 17 previously described, of Fig. 2. The outlet unit 17' is, however, provided with a standpipe 76 secured to the lower end thereof and extending downward to near the bottom of the service reservoir 71 so that even when the oil is at low level it will be propelled therethrough under the expansive force of the air imprisoned in the top of said reservoir.

Instead of the float or pressure check valve of Fig. 2, I have illustratively shown a thermostatic check valve 77 preferably having a shank 78 mounted in a slot at the end of a thermostatic strip 79 riveted at 80 to the bottom of the reservoir 71. The valve seats into the lower end of a pipe 81 affixed in a socket 82 in the top of the reservoir through which connection with pipe 75 is made by a coupling 83.

When the engine is started, the thermostatic strip 79 being adjacent the heated exhaust pipe, expands promptly and closes valve 77 to prevent the return of lubricant to the main reservoir. The air within the reservoir 71 in its expansion will force lubricant through pipe 76 and, during the operation of the vehicle and the jiggling of the valve within unit 17' lubricant will be slowly forced through the pipe system to the bearings in the manner previously described. At 71' is shown an air bleeding plug which, when the system is initially installed in the vehicle is opened until the oil has risen in reservoir 71 to the level shown, whereupon said plug is sealed.

Inasmuch as a substantial body of oil is placed in close proximity to the exhaust manifold in the present embodiment and boiling or cooking of the oil is to be avoided in order to maintain its lubricating properties intact, I have shown automatic heat limiting means, embodying a thermostat to control the flow along the reservoir walls of the current of air from the radiator R. For this purpose, the entire service reservoir 71 is preferably enclosed within a tunnel 85 disposed over the reservoir with substantial air space therearound. The tunnel preferably extends longitudinally of the engine, immediately in back of the radiator R and is lined at 87 with asbestos or other heat insulating means. A shutter 88 controls the air drawn through the tunnel and consequently determines the heat withdrawn from the reservoir walls. The shutter 88 may be centrally hinged at 89 and operated from a thermostat strip 90 within the tunnel, the thrust from which is transmitted through a push rod 91 sliding in bearings 92 and engaging the shutter 88 at a point immediately below the pivot 89. Accordingly, with increase of temperature and expansion of the thermostat, the shutter is pushed open thereby increasing the ventilating effect. With decrease in temperature and contraction of the thermostat, the shutter is correspondingly moved to closing direction by the return spring 93 coiled about its pivot 89.

Preferably additional automatic compensation is provided in order to permit increased propulsive force in winter operation, when the oil in the distributing piping becomes highly viscous due to cold. For this purpose, I have shown an additional thermostat strip 94 the operation of which is dependent on the temperature of the atmosphere. It is preferably mounted upon a bracket 95 immediately in back of the radiator and is thus subject to the temperature of the blast through the radiator which in turn depends on that of the atmospheric air. Thermostat 94 determines the position of the pivot 89 of the shutter. For this purpose, the shutter is mounted preferably on the end of a stiff leaf spring 96 affixed to the top of the tunnel 85. A connecting rod 97 serves as the transmission between the thermostat strip 94 and the shutter mount 96, and has a ball end 98 protruding through the strip 94 and a ball end 99 through the spring mount 96. As the temperature drops, the thermostat strip straightens and through the connecting rod 97 pulls the spring mount 96 correspondingly outward. Greater expansion of the thermostat 90 within the tunnel is thus needed to open the shutter 88 and a higher temperature must accordingly be reached in the reservoir 71 in winter than in summer before the shutter will open. As the weather grows warmer and the strip 94 again expands, away from the connecting rod 97, mounting strip 96 returns to vertical by virtue of its own resiliency and carries the shutter pivot 89 back with it.

Preferably thermostat 94 is set to over-compensate for cold, so that the shutter is pulled outward to such extent as to permit in cold weather, a rise of temperature within the service reservoir 71 greater than in proportion to the temperature. Thereby the rapid increase in viscosity of the oil, which is substantially in a geometric progression with drop of temperature, may be adequately compensated for.

Figure 7:
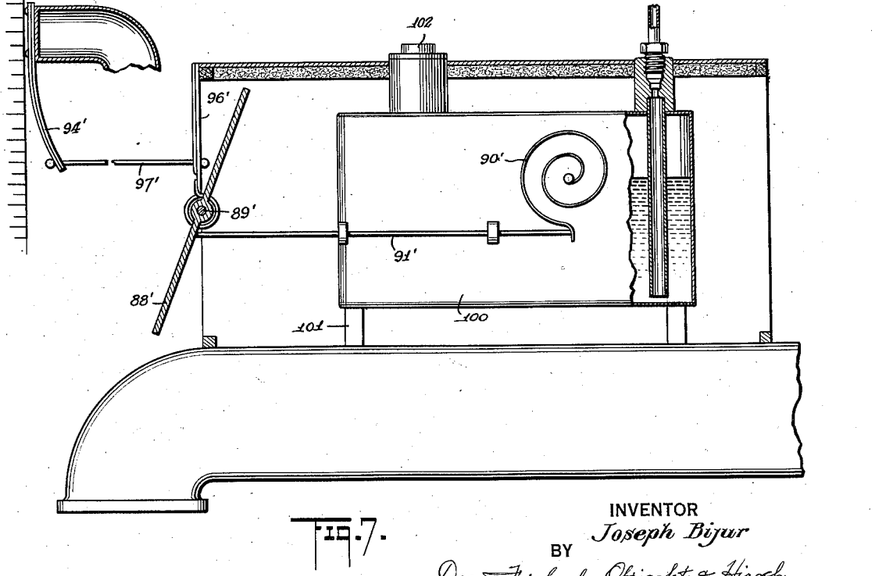
Fig. 7 is a view similar to Fig. 6 of a simplified form of supply installation.

In Fig. 7 is shown a less refined embodiment of the invention in which but a single main reservoir 100 is provided, mounted on legs 101 affixed directly upon the exhaust manifold in the same manner in which the service reservoir is mounted in the embodiment of Fig. 6. The reservoir has a filler cap 102 but is otherwise completely closed.

The same thermostatic shutter control and over-compensated winter temperature control is here shown as in the embodiment of Fig. 6. Similar reference characters with prime marks are applied to corresponding parts, and further description thereof is unnecessary.

Thus, the entire body of oil is kept from becoming overheated, while the over-compensating thermostat allows a higher temperature in winter than in summer, to generate sufficient pressure to overcome the increased resistance to flow in the piping and the restriction members.

Figure 8:
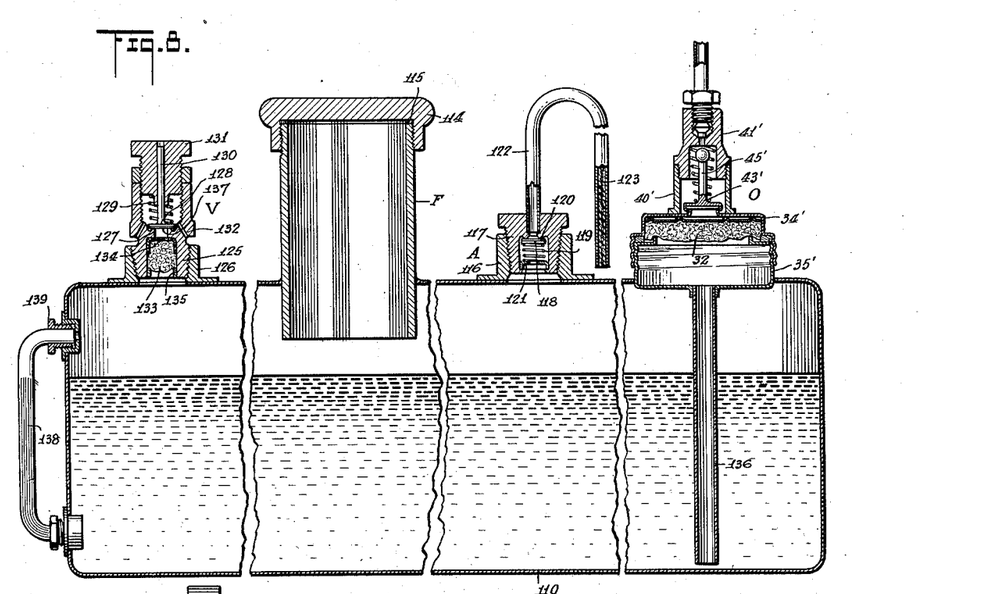
Fig. 8 is a view in longitudinal cross-section of another embodiment of supply installation.
Figure 9:
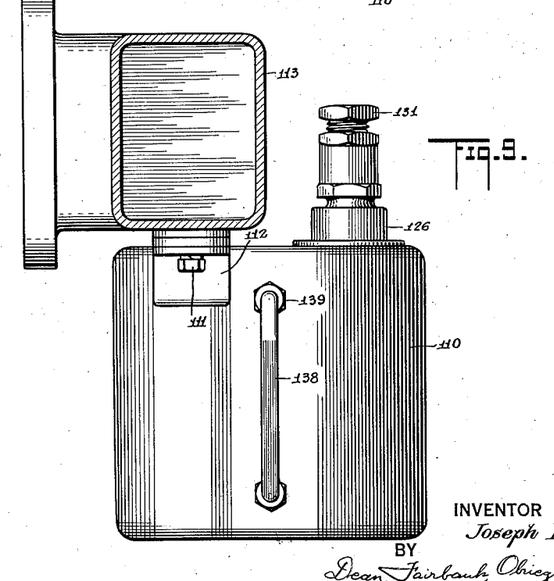
Fig. 9 is an end elevation, partly in section, showing a preferred manner of mounting the installation of Fig. 8.

In Figs. 8 and 9 is shown another embodiment of heat expansion reservoir for use in a system of the type previously described. A rectangular reservoir 110 is shown, with its top secured by means of bolts 111 applied through welded lugs 112 against and substantially in contact with the lower wall of the exhaust manifold 113. By this means, the heat from the manifold will be applied to the air at the upper part of the reservoir rather than through the oil, so that the latter is not likely to be heated excessively, or boiled, even in the absence of thermostatic controls. In front of the exhaust manifold the mounted reservoir has various appurtenances including a filling neck F, an air inlet fitting A, an outlet control unit O, and a relief valve unit V.

The filling neck F is preferably a sleeve welded into the top of the reservoir and closed by means of removable insulating cover cap 114 with a gasket 115 therein.

The air inlet unit A preferably comprises a socket member 116 welded or brazed onto the top of the reservoir. A plug 117 is threaded into the socket 116 and has a disk valve 118 therein pressed by means of a coil spring 119 against seat 120, the coil spring reacting against a friction-fitted cap 121. Brazed into a central opening in the threaded plug is a length of reversely bent pipe 122 filled with an air cleaning wick 123.

The safety valve unit V comprises a plug fitting 125 threaded into a socket 126 which is welded onto the top of the reservoir. The plug fitting 125 has unitary therewith a valve seat 127, with which coacts a disk valve 128 urged against its seat by a coil spring 129 about the shank 130 of the valve which is slidable in a closure plug 131 threaded into the upper end of the fitting 125. Oblique venting ports 132 extend downward and outward from adjacent the valve seat. At the lower side of the valve seat is preferably provided a filter plug 133 of wool felt, having a backing cup 134 of wire mesh screen, said plug pressed in place at its lower extremity by means of a metal ring 135. The unit O is preferably identical with that shown in Fig. 2 and, need not be described, parts corresponding to those in Fig. 2 bearing the same reference numerals primed. The outlet unit, however, has affixed to the bottom thereof a length of pipe 136 extending downward into the reservoir to near the bottom thereof, substantially as in the embodiment of Fig. 6.

Preferably each of the valves 118 and 128, as well as the valve 43' of unit O, is provided with a facing 137 of varnished silk or the like to assure an effective closure.

At one end of the reservoir is preferably provided a level indicator comprising an ordinary bent glass tube 138 secured at its ends into the reservoir wall by appropriate coupling fittings 139.

In operation, the expansion of the air in top of the reservoir while the engine is running will cause the propulsion of lubricant from the reservoir upward through pipe 136, filter 32' and past valve 43' to the pipe line. As previously noted, the valve 43' moves from its seat under the vibration of the moving vehicle and thus, the pressure generated in the reservoir is effectively applied for propulsion of the lubricant through the length of the distributing piping and through the resistant outlets thereof.

When the engine is stopped and the air in the reservoir is cooled and contracts, a sub-atmospheric pressure of the air in the reservoir results, owing to the fact that the same quantity of trapped air now occupies a larger space, since some of the oil has been forced out. This suction will cause the air inlet valve 118 to open against spring 119 and air, cleansed by passage through the wick 123 will enter the reservoir to restore substantially atmospheric pressure. The check valve 43' of course prevents the application of suction by this expansion action to the distributing pipe line.

The relief valve 128 will open should excessive pressure due to excessive heating occur. In order to increase the pressure in winter and thereby to overcome the higher resistance to flow in the length of the pipe line and restriction outlets, the plug is screwed inward to compress spring 129 so that a higher pressure is needed before relief occurs. For rising temperatures, the plug is correspondingly screwed in opposite direction to weaken spring 129. The plug 131 may be manually controlled, or by means of a thermostat (not shown) controlled by the temperature of the atmosphere.

The outlet fittings f may be of any of a variety of different constructions. In one embodiment, the resistance may be embodied in a length of wicking, preferably of the so-called pipe cleaner type in which transverse strands of felt are securely clasped between the elements of a core 150 of twisted wire. These lengths of wicking fit securely in the lengths of piping 151 that constitute the exterior of the fittings f, and thereby impose a substantial resistance to flow. Fittings of different calibration are readily produced by cores of different lengths, within pipe sections of uniform or one and the same length, each fitting emitting at its definite calibrated rate of so many cubic millimeters per hour under a given pressure. Preferably, the fittings are provided with appropriate calibration indications, which may be numerical in character, the higher the index number the faster the rate.

In Figs. 10 and 11 the calibration mark appears as a numeral 152 stamped on the pipe sufficiently far from the end thereof, to be exposed beyond the terminal connection. The end of the felt wicking may be held in place by notches 153 in the pipe, adjacent each end 154 of the wicking 155. The wicking is preferably stripped off the wire core, which may extend the length of the fitting f, as shown. Inasmuch as the distance of the notches 153 from the extremity of the pipe length depends on the length or resistance of said wicking, the location of said notches, may itself serve as a calibration mark.

In Fig. 12 is shown another embodiment in which the calibration is represented by a number of peripheral grooves 156 thereabout, preferably beyond the end of the wick 157, the three grooves shown by way of example indicating calibration 3.

In Fig. 13 is shown an embodiment of the type in which the pipe fitting has a compression coupling sleeve 160 soldered or forced thereon near the end thereof and serving to prevent removal of the compression coupling bushing 161 which thus constitutes a part of the fitting assembly. In this case the calibration is indicated by a numeral 162 on the head of the coupling.

In Fig. 14 is shown illustratively the manner of applying the end of one of the fittings f at the bearing. The end of the pipe fitting 163 is inserted, with the end of the coupling sleeve 160 engaging the corresponding shoulder 164 in the socket 165. When the threaded bushing 161 is applied and tightened at the bearing, a lubricant-tight connection is made at the coupling sleeve 160.

Each of the fittings of Figs. 10 to 14 is substantially as flexible as the length of distributing piping of which it forms a part, and is readily bendable for adaptation to the form of the chassis structure, or for bridging between separated elements.

The filter at the supply installation intercepts any fine solid particles in the lubricant, and so prevents possible clogging of the wicking in the outlet fittings. The latter will enmesh any coarse particle of oxide, scale or metal chips entrained in the flow through the pipe length.

Figure 15:
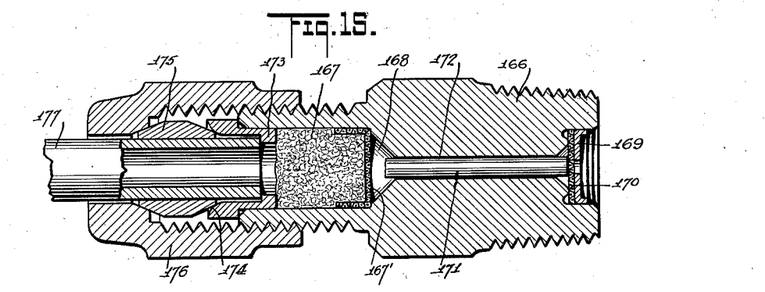

Another embodiment of outlet comprising a very short fitting is shown in Fig. 15. The fitting 166 is a screw plug secured at the bearing, and has a filter plug 167 backed by a wire mesh screen cup 167', in a corresponding socket 168 at the inlet end of the fitting and a friction fitted collar 169 backed by wire mesh screen 170 at the outlet end thereof. A metal pin 171 is retained in place within a corresponding bore 172 extending lengthwise of the fitting between the filter plug and the cap. The pin is of accurate diameter fitting in an accurate bore but little larger, the clearance determining the rating of the drip plug. A hard-metal collar 173 forced into the inlet end of the fitting presses the outer rim of the filter plug 167 in position, said collar being formed with a bevel 174 engaged by the end of the compression coupling sleeve 175 which is tightened by the bushing 176 encircling pipe extremity 177 and threaded upon fitting 166.

The inertia valve 43—45—46 in Fig. 2 under the influence of the spring 48 will prevent lubricant under pressure being dispensed from the pipe 19 to the conduit 18 unless the automobile is moving. Without this inertia check valve the lubricant could flow freely from the pipe 19 into the pipe 18 when the air in the pipe 19 is heated from the exhaust pipe e. If the inertia check valve were omitted the bearings of the car would be supplied with an excess of lubricant after the automobile started and the chassis bearings would not receive their supply after the automobile had been operating for an extended period.

The inertia valve is particularly satisfactory, inasmuch as its vibrations and its openings will be approximately proportional to the relative movements to the chassis of the automobile in respect to the axle, which movements principally actuate the chassis bearings to be lubricated. In this manner the inertia valve not only will prevent an excessive supply of lubricant to the automobile chassis bearings but in addition will regulate such supply more or less according to the requirements of said bearings.

I claim:—

1. In a chassis lubricating installation of the type comprising a distributing system having highly restricted outlets leading to the bearings; the combination therewith of a supply installation comprising an enclosure having lubricant in one part thereof and a permanently gaseous fluid imprisoned in another part thereof directly contacting with said lubricant, said enclosure, having one part in direct heat interchange relation with a hot portion of the engine, thereby to cause the expansive force of the heated gaseous fluid to propel lubricant from said enclosure into the pipe system, said supply installation having means in advance of said pipe system to satisfy the vacuum due to the contraction of the gaseous fluid in said enclosure upon cooling, and means to prevent return of lubricant from said pipe system.

2. In an automatics chassis lubricating system; the combination of a source of lubricant, a distributing piping system supplied therefrom and having a plurality of highly restricted flow controlling outlets, means for applying a sustained pressure upon the lubricant during operation of the vehicle, a valve controlling the inlet to said distributing system, and operating means for said valve to intermittently open and close the same in response to vibration of the moving vehicle during locomotion thereof.

3. In a chassis lubricating system, the combination of a source of lubricant, means exerting a sustained pressure thereon, a distributing piping system having highly resistant metering outlets, and a spring-seated valve at the inlet to the piping system and including a weighted shank, adapted to rock on its seat under the vibration of the moving vehicle, to permit application of lubricant propulsive pressure to the distributing system while the vehicle is running.

4. In a chassis lubricating system, a lubricant reservoir, a distributing piping system communicating therewith, and having highly restricted outlets leading to the bearings, means for maintaining pressure upon the lubricant in the reservoir and also for creating a suction from time to time in the interior of the reservoir, and a non-return valve at the inlet to said pipe system to prevent withdrawing lubricant therefrom during said suction application, said valve being lifted from its seat incidental to operation of the vehicle, thereby to permit communication from the reservoir to the pipe line, while the vehicle is running, said means for maintaining pressure including an entrapped air body and a heating arrangement for causing expansion of said air body effective during operation of the vehicle and said suction being created by subsequent cooling of the air.

5. In a chassis lubricating system, the combination of a lubricant reservoir, means for applying a sustained pressure thereto, a distributing pipe system having highly restricted metering outlets to lead to the bearings, a valve at the inlet to said system, having a weight to cause the valve to rock with respect to its seat during locomotion of the vehicle in order to permit the discharge of lubricant under pressure into the pipe system, and a filter between said reservoir and said valve.

6. In a chassis lubricating system, the combination of a lubricant reservoir, means for applying a sustained pressure thereon during the operation of the engine, a distributing piping system supplied from said reservoir and having highly restricted flow controlling outlets, and a weighted valve seated to shut off the piping system from the source of pressure, said valve moving relatively to its seat under the vibration of the moving vehicle to permit effective propulsion of lubricant under the sustained pressure, from the reservoir into the distributing pipe.

7. In a chassis lubricating system of the type comprising a distributing system having highly restricted outlets leading to the bearings; the combination therewith of a supply installation including an enclosing wall structure having air therein and oil therein, the latter contiguous to the head of the distributing piping, said installation having a part in heat interchange relation with a portion of the engine, whereby the heated air will exert pressure to propel lubricant from said installation into the distributing system, said installation having a valve associated therewith through which air is admitted to re-establish substantially atmospheric pressure after the reduction of pressure consequent upon cooling of the air after operation.

8. In a chassis lubricating system, the combination of a reservoir subjected to heat from the engine and having an outlet adapted for communication with a distributing piping system, said outlet including a non-return valve to prevent withdrawal of lubricant from the pipe line by suction due to cooling of the reservoir, said reservoir having an air inlet valve opening under suction and an air cleaner protecting said inlet valve.

9. In an oil and air reservoir for a central lubricating system of the type utilizing the expansive force of the air as a result of heating to propel lubricant through a distributing piping system; the combination therewith of a spring-seated adjustable safety valve in the top of said reservoir limiting the pressure thereon, and a spring-seated air supply valve limiting the rarefaction of the air in the reservoir consequent upon cooling after use.

10. In a central lubricating system, the combination of an oil reservoir, containing a body of oil in the lower part thereof, and a body of air confined in the upper part thereof, an outlet device in the top thereof including a pipe extending downward to near the bottom thereof, said device having a non-return valve therein and being adapted for connection to a distributing piping system, means to cause an expansion of said body of air and a resultant rise in pressure in said reservoir, causing ejection of oil through said device, and also to cause a contraction of said body of air and a resultant decrease of pressure, an adjustable relief valve in the top of said reservoir to limit the rise of pressure therein, and an air inlet valve to permit the entry of air to satisfy the vacuum consequent upon decrease of pressure in the reservoir.

11. In a chassis lubricating installation of the type comprising a distributing piping system having highly restricted outlets leading to the bearings; the combination therewith of a reservoir connected near its bottom to said system and having lubricant therein partially filling the same and air thereabove, the upper part of said reservoir being in substantially direct contact with a heated part of the engine, to cause expansion of the air without boiling of the oil, thereby to propel lubricant from the reservoir into the pipe system, said reservoir being provided with means in advance of said piping system to satisfy the vacuum due to the contraction of the air in said reservoir upon cooling.

12. A supply installation for a pressure lubricating system comprising a reservoir subjected to heat from the engine, said reservoir having an outlet for connection to a distributing piping system, through which lubricant passes under the propulsive force of the air within said reservoir, the propulsive force of the air being obtained due to heating of the same by the heat from the engine, a valve at said outlet preventing return flow of lubricant from the piping system, under the suction generated by contraction upon cooling after the engine is stopped, said reservoir having an air valve through which the vacuum generated by cooling is satisfied by the entry of air.

13. In a lubricating system, the combination of an oil reservoir entrapping above the oil, a body of air and having a filling neck through its top, an outlet unit through its top, means to heat the air periodically, said unit including a non-return valve, an outlet connection extending to near the bottom of the reservoir, a safety valve in said top, limiting the pressure generated by expansion of the air due to heat and an air inlet valve through the top through which is satisfied the vacuum generated in the cooling after such periodic heating.

14. A chassis lubricating installation comprising a distributing system having highly restricted outlets leading to the bearings, and a supply installation including a main reservoir and a service enclosure, the latter having lubricant in one part thereof and air imprisoned in another part thereof directly contacting with said lubricant, said enclosure being in direct heat interchange relation with a part of the engine, thereby to cause the expansive force of the heated air to propel lubricant from said enclosure into the pipe system, means to prevent return flow of lubricant from said system to said enclosure, and a valve controlling the flow from the main reservoir to the service enclosure, and arranged to open as the temperature in the latter drops, upon stopping of the engine.

15. In a supply installation for a chassis lubricating system, of the type including the combination of a main reservoir containing a body of oil and a body of air thereabove, a distributing piping system, means to cause said body of air to exert pressure upon said body of oil and to force it into said piping system, a check valve preventing return flow to the reservoir, and a delivery valve controlling admission to the distributing system, the apparatus determining an oil receptacle between said valves, means controlling said latter valve, whereby it will be normally closed, and will be operated by vibration of the vehicle.

16. A chassis lubricating system including an oil containing reservoir, a smaller service reservoir in communication therewith, a distributing piping system having highly restricted outlets and communicating with said service reservoir, and propulsive means comprising an air-containing enclosure having a part subjected to a hot portion of the engine and the resultant heat expansion of the air serving to apply the consequent expansive force to the lubricant in said service reservoir, said air being in direct contact with the lubricant, said expansive force causing the lubricant to flow into the piping system, and means being provided both to prevent return flow from the system to the service reservoir, and from the service reservoir to the first mentioned reservoir.

17. A chassis lubricating system including an oil containing reservoir, a smaller service reservoir in communication therewith, a distributing piping system having highly restricted metering outlets communicating by a check valved connection with said service reservoir, propulsive means comprising an air containing enclosure having a part thereof subjected to a hot portion of the engine, said air upon being heated serving to apply the consequent expansive force to the lubricant in said service reservoir to propel it into said system, and means to automatically shut off communication between the main and the service reservoir during running of the engine, said air being in direct contact with the lubricant.

18. A supply installation for a central chassis lubricating system of the pressure type, said installation comprising a lubricant reservoir, a smaller service reservoir, a check valve intervening between said reservoirs, and an elongated air receptacle in open communication with the contents of said service reservoir, and having one end thereof closed and in heat exchange relation with a part of the engine.

19. A supply installation for a central chassis lubricating system including a lubricant reservoir, a valve to control the inlet to a distributing system, a connection between said reservoir and said valve, an upstanding pipe communicating with said connection and containing a gas in the upper part thereof, the upper part of said pipe in intimate heat interchange relationship with a hot portion of the engine, and a check valve between said reservoir and said pipe.

20. A chassis lubricating system comprising the combination of a lubricant reservoir, a distributing piping system, a valve controlling the outlet from said reservoir, a valve controlling the inlet to said piping system, and an upstanding pipe intervening between said valves, and having its upper part in heat interchange relationship with a heated part of the engine, said inlet controlling valve opening under the expansive force of heated air in said upstanding pipe and said reservoir outlet valve closing under said force, and the relation of said valves reversing under the suction effected due to cooling of the engine.

21. In a motor vehicle, the combination of a lubricant supply reservoir at relatively low level and remote from the heated part of the engine, a distributing piping system leading therefrom to the various bearings, and having restriction outlets, an upstanding pipe communicating with the reservoir outlet, the upper end of said pipe in intimate heat interchange relationship with the engine exhaust, a valve at the outlet of said reservoir raised to closed position under the expansive pressure of the heated air in said upstanding pipe, and a valve at the inlet to the distributing piping system, opening under said pressure for delivery of lubricant from said upstanding pipe, whereby in the contraction of the heated air upon stopping of the engine, said latter valve will prevent suction upon the distributing line and suction will be applied to the main reservoir to draw oil into the upstanding pipe.

22. In a lubricant supply installation for a central chassis lubricating system, the combination of a short circular pipe section interposed between the exhaust manifold and the exhaust pipe therebeyond, said pipe section having an annular passage in the interior of the wall thereof, and a standpipe leading down from said section, a lubricant supply reservoir and a lubricant distributing system connected to the lower end of the standpipe, and valves, one to close the reservoir during the pressure evolved by the expansion of heated air, the other closing the inlet to the distributing piping under the suction due to the contraction of the heated air upon stopping the engine.

23. In a chassis lubricating system, the combination of an oil reservoir, a control pipe containing a gaseous fluid, means for alternately reducing and increasing pressure on the gaseous fluid in said pipe, to alternately withdraw lubricant from said reservoir, and to propel it into a distributing system, a valve at said reservoir to prevent return of lubricant to the latter in the high pressure phase of the cycle of operation, and a valve at the inlet to the piping system to prevent the application of suction thereto in the low pressure phase of the cycle, said means for reducing and increasing pressure including an arrangement for increasing the temperature of the gaseous fluid to cause expansion thereof and for reducing the temperature to cause contraction thereof, said gaseous fluid consisting of air and said air being in direct contact with said oil.

24. A supply installation for a pressure lubricating system comprising a lubricant reservoir, a unit distinct from the reservoir, having a valve therein, controlling the admission of lubricant from the reservoir to a distributing piping system, a standpipe in heat interchange relation with a part of the engine the lower end of said standpipe having a T connection to the outlet of said reservoir, and to the inlet of said valve unit respectively, a disk valve in the bottom of said reservoir preventing return flow of lubricant, a filter in said reservoir above said disk valve, and a filter in said valve unit in the course of flow to the valve thereof.

25. In a chassis lubricating installation of the type comprising a distributing system having highly restricted outlets leading to the bearings; the combination therewith of a supply installation including a main reservoir and a service reservoir, the latter having lubricant in one part thereof and air imprisoned in another part thereof, said enclosure being in direct heat interchange relation with a part of the engine, thereby to cause the expansive force of the heated air to propel lubricant from said enclosure into the pipe system, and a thermostatic valve controlling the flow from the main reservoir to the service enclosure under direct influence of the heated engine and arranged to close upon starting of the engine and to open after the latter has cooled.

26. A lubricant supply installation for a central chassis lubricating system including a main reservoir, a service reservoir having an outlet for connection to a distributing piping system, said service reservoir having a part enclosing a fluid body for heat interchange relation with the engine, to exert propulsive pressure for forcing lubricant into the piping system, and a thermostatically closed valve, subjected to heat from the engine to prevent the flow of lubricant between the main and the service reservoir while the engine is in operation.

27. In a motor vehicle, the combination of a main reservoir at higher level, a service reservoir at lower level containing a temperature responsive propulsive agency, and disposed adjacent the exhaust manifold of the engine, an outlet unit mounted on said service reservoir and having a supply pipe extending downward therefrom to near the bottom of said service reservoir, a thermostatic strip at the bottom of said reservoir having a valve thereon and a seat therefor in communication with said main reservoir, said supply pipe being adapted to conduct lubricant to bearings to be lubricated.

28. In a supply installation for a chassis lubricating system, of the type including the combination of a main reservoir containing a body of oil and a body of air thereabove, a distributing piping system, means to cause said body of air to exert pressure upon said body of oil and to force it into said piping system, a check valve preventing return to the reservoir and a delivery valve controlling admission to the distributing system, the apparatus determining an oil receptacle between said valves, thermostatic means controlling said check valve and vibration operated means controlling said delivery valve.

29. In a chassis lubricating installation, the combination of a lubricant supply reservoir, a lubricant service reservoir, subjected to heat from the engine and enclosing a body of gas, the expansive force of which under heat causes propulsion of lubricant therefrom, a thermostatic valve at said service reservoir, to prevent interchange of lubricant between the two reservoirs during heat application, a thermostat for limiting the temperature of the service reservoir and another thermostat subjected to the temperature of the atmosphere for controlling the maximum temperature of the service reservoir.

30. In a central chassis lubricating system of the type in which the expansive force of a medium subjected to heat from the engine serves as the propulsive agency, piping with flow controlling means and means to automatically increase said expansive force as the weather becomes colder in order to compensate for increasing viscosity of lubricant, and an automatic control for said means including a thermostat controlling the proportion of available heat applied to the expansive medium.

31. In a chassis lubricating system, the combination with piping having flow controlling means, of an oil and air receptacle mounted in proximity to the engine exhaust, and in back of the engine radiator, the expansion of air in said receptacle serving as the propulsive agency for lubricant, a tunnel longitudinally of the vehicle enclosing said receptacle, means for causing a current of air to pass therethrough and a shutter for said tunnel in front of the receptacle and a thermostat subjected to the heat within said tunnel to open said shutter and limit the rise of temperature.

32. In a chassis lubricating system, the combination with piping having flow controlling means, of a vessel containing lubricant and mounted on the engine exhaust in back of the radiator, a tunnel enclosing said vessel, means for passing a current of air through said tunnel, a spring-urged shutter closing the front of said tunnel, and a thermostat subjected to heat corresponding to that in said vessel and connected to said shutter to open the latter when a predetermined temperature is exceeded.

33. In a chassis lubricating system the combination with piping having flow controlling means, of an oil reservoir mounted on the engine exhaust, a tunnel enclosing the same and having its front opening in back of the engine radiator to receive a current of air passing through said radiator during movement of the chassis, a pivoted shutter spring urged to close the front of said tunnel, a thermostat within said tunnel, and a push rod mounted in said tunnel for longitudinal movement thereof by expansion of said thermostat, to engage and open said shutter.

34. In a central lubricating installation for a mechanism having an internal combustion engine with an exhaust manifold and a radiator to receive a blast of air, the combination with piping having flow controlling means, of an oil reservoir mounted on the exhaust manifold of an engine, and having a heat expansive medium therein, means for applying the blast of air through the engine radiator to the walls of said reservoir and shutter means arranged to respond in position to the temperature of said reservoir for automatic control of the application of the air blast to the reservoir.

35. In a central lubricating installation for a mechanism having an internal combustion engine with an exhaust manifold and a radiator to receive a blast of air, the combination with piping having flow controlling means, of an oil reservoir mounted on the exhaust manifold of an engine, and having a heat expansive medium therein, means for applying a blast of air through the engine radiator to the walls of said reservoir, and shutter means arranged to change its position in response to the temperature of said reservoir, and temperature control means subjected to the temperature of the air through the radiator for automatically adjusting the position of said shutter to permit increase of temperature of said reservoir in an inverse ratio with the temperature of the air.

36. In a central chassis lubricating system the combination with piping having flow controlling means, of an oil reservoir mounted on the engine exhaust and having air therein to effect propulsion of the lubricant, an air blast tunnel enclosing said reservoir and opening at the back of the radiator, a shutter for controlling the opening of said tunnel, thermostatic means within said tunnel for limiting the temperature of said reservoir, and thermostatic means at said radiator determining the setting of said shutter relative to said first thermostatic means, in order to cause the temperature and pressure to rise higher as the weather becomes colder.

37. In a central chassis lubricating system, the combination with piping having flow controlling means, of an oil reservoir, mounted on the engine exhaust and having air therein to effect propulsion of the lubricant, an air blast tunnel enclosing said reservoir, an opening at the back of the radiator, thermostatic means for limiting the temperature of said reservoir, said means comprising a pivoted shutter at the forward end of said tunnel, a displaceable mount for said shutter, thermostatic means within said tunnel coacting with said shutter to open the same when a predetermined temperature is reached and thermostatic means exteriorly of said tunnel and responsive to atmospheric temperature, for displacing the pivot of said shutter and decreasing the effectiveness of said first thermostat, thereby to effect rise of temperature and pressure in winter to higher levels than in summer.

38. In a central chassis lubricating system the combination with piping having flow controlling means, of an oil reservoir mounted on the engine exhaust and having air therein to effect propulsion of lubricant, an air blast tunnel enclosing said reservoir, an opening at the back of the radiator, thermostatic means for limiting the temperature of the oil in said reservoir, said means comprising a pivoted shutter, a depending leaf spring mounting the pivot of said shutter, a thermostat in said tunnel, a push rod interposed between said thermostat and said shutter, a second thermostat adjacent said radiator, and a connecting link for drawing said leaf spring mount outward as said second thermostat contracts with drop of temperature.

39. A central lubricating installation comprising a central source of lubricant supply and pressure, a distributing piping system with a plurality of outlets and a set of pipe fittings of uniform length for use with the outlets, said fittings each having tightly fitted therein flow restricting wicking of calibrated resistance to flow, each of said fittings having a corresponding calibration marking.

40. A central lubricating installation comprising a central source of lubricant supply and pressure, a distributing piping system with a plurality of outlets and a set of calibrated fittings associated with said outlets including uniform lengths of piping having wicking tightly fitted therein extending through part of the length thereof, the flow rating of the fittings varying inversely with the length of said wicking, and calibration marks at the exterior of the piping indicative of the rating thereof.

41. A central lubricating installation comprising a central source of lubricant supply and pressure, a distributing piping system with a plurality of outlets and a set of calibrated fittings associated with said outlets including uniform lengths of piping having wicking tightly fitted therein, extending through part of the length thereof, the flow rating of the fittings varying inversely with the length of said wicking, and indentations in the pipe wall determining the location of the ends of the wicking and serving as calibration marks.

42. A central lubricating installation comprising a central source of lubricant supply and pressure, a distributing piping system with a plurality of outlets and a set of pipe fittings associated with said outlets of substantially uniform length to determine diverse rates of flow emission under a given pressure, each of said fittings comprising a pipe length, having coupling sleeves near the ends thereof and rigid therewith and terminal bushings for the installation of the fittings, maintained by said sleeves from coming off the pipe lengths, said fittings having lengths of wicking tightly fitted therein, of diverse flow resistances, and calibration marks on said bushings corresponding to the flow resistances of the wicking, and designating the relative flow ratings of the corresponding fittings.

43. The combination of a chamber containing an expansible and contractible medium and lubricant in contact with each other and designed to be subjected to the action of the hot exhaust gases of an internal-combustion engine, piping means equipped with a check-valve to deliver lubricant expelled from said chamber by the expansion of said medium, and piping means fitted with a check-valve to permit the contraction of said medium to draw lubricant into said chamber.

44. A central lubricating installation for a vehicle having a plurality of spaced bearings which comprises a central lubricant reservoir, a distributing piping system with flow controlling outlets to said bearings, means tending to force lubricant continuously only during operation of the vehicle from said reservoir into said system to said bearings, at a rate in excess of the needs of the bearings and a spring-controlled inertia-weight operated vertically reciprocating valve between said forcing means and said system to decrease the flow to the needs of the bearings.

45. In a chassis lubricating system for a vehicle, a supply reservoir, a plurality of bearings to be lubricated, conduit means having a plurality of outlets to supply the oil to the said bearings, means in each outlet to govern the discharge of lubricant to the corresponding bearing, means tending to deliver lubricant from said reservoir slowly and continuously only during operation of the vehicle under pressure to said conduit means, at a rate in excess of the needs of the bearings a vertically reciprocating check valve cooperating with a valve seat and arranged to permit flow toward said conduit means from said delivery means, and a weight supported by and above said valve and arranged to be vibrated by the motion of the vehicle to cause elevation of the valve above its seat, said weight and said valve being so correlated that said weight will maintain said valve in closed position when the chassis is at rest, and decrease the flow to the needs of the bearings.

46. In a chassis lubricating system, the combination of a reservoir having lubricant therein, distributing piping supplied therefrom having flow resistant outlets leading to the bearings, a source of heat on the vehicle, and an enclosure holding a gas body interposed between said source of heat and the lubricant in said reservoir, said enclosure directly communicating with said reservoir so that said gas body directly contacts the lubricant in said reservoir, said lubricant and said gas body being so arranged that lubricant will be propelled into the pipe line under the thermal expansion force of the gas body, said reservoir being provided with a valved connection to said distributing piping, the valve of said connection preventing reverse flow from the piping to the reservoir incidental to a decrease in pressure in the reservoir due to thermal contraction of the gas body therein.

47. A chassis lubricating system for an automobile vehicle provided with an engine having a tubular elongated exhaust manifold, including piping, controlling outlets and means for utilizing the expansive force of air as the propulsive agency, said means comprising a tubular air-containing body inserted in said exhaust manifold and in heat exchange relation with the heated exhaust gas and without direct contact therewith, said body including a downwardly extending pipe containing lubricant in communication with said piping through which the propulsive force is applied to a body of lubricant, said propulsive force arising due to thermal expansion of the air in said body, which expansion exerts pressure upon the lubricant in said downwardly extending pipe to force it into the piping.

48. A chassis lubricating system for an automobile vehicle provided with an engine having a tubular elongated exhaust manifold comprising piping, controlling outlets and means for utilizing the expansive force of heated air for the propulsion of lubricant, said means comprising a closed hollow chamber cast as an integral part of the wall of the exhaust manifold, whereby the air therein will be heated in operation of the engine, and a downwardly extending pipe leading from said chamber containing a body of lubricant remote from the exhaust for application of the air expansive pressure to the body of lubricant therein, said air expansive pressure arising due to thermal expansion of the air in said chamber, which expansion exerts pressure upon the lubricant in said downwardly extending pipe to force said lubricant into the piping.

49. In a central chassis lubricating system of the type effecting oil propulsion by expansion of a medium contained in a vessel subjected to the heat of the engine and cooled by the air blast through the engine radiator; a piping system leading to the chassis bearings, a lubricant containing vessel, temperature controlled means for forcing lubricant from said vessel into said system, means for controlling the heating of said means including a thermostatically controlled shutter in the path of the air blast through the engine radiator and means to prevent reverse flow in said system.

50. A central lubricating system for a machine of the type subjected to varying atmospheric temperature and provided with a heat source, a piping system leading to said bearings, a temperature controlled means for forcing lubricant under pressure into said system and means for regulating the heating of said temperature controlled means by said source, the outlet of said vessel to said system being provided with a check valve to prevent return flow of lubricant.

51. A central lubricating system, for a machine of the type subjected to varying atmospheric temperature and provided with a heat source, a piping system leading to said bearings, a temperature controlled means for forcing lubricant under pressure into said system and means for regulating the heating of said temperature controlled means by said source, said temperature controlled means including an enclosure containing an expansive fluid, the expansion of said fluid under the influence of heat from said source applying pressure to said lubricant.

52. In a central chassis lubricating system of the type in which the expansive force of a medium subjected to heat from the engine serves as the propulsive agency, a branched piping system, a lubricant reservoir, a lubricant propulsive agency of the character described forcing lubricant from said reservoir under pressure into said system, means for automatically limiting the temperature to which the propulsive agency can rise, and automatic means responsive to the temperature of the atmosphere to automatically vary said maximum in an inverse relation with the temperature.

53. In a central chassis lubricating system, the combination of means for forcing lubricant into said system including an oil reservoir, an outlet device in the top thereof including a pipe extending downward to near the bottom thereof, said device having a non-return valve therein and being adapted for connection to a distributing piping system, said reservoir entrapping an air body and means to cause periodic increases and decreases in the pressure of said body an adjustable relief valve in the top of said reservoir to limit the rise of pressure therein, and an air inlet valve to admit air to satisfy the vacuum consequent upon decrease of pressure in the reservoir, said outlet device including a filter below the valve thereof, said safety valve including a filter therebelow, and said air inlet valve including an air cleaner at the inlet side thereof.

54. In a central lubricating installation for a mechanism having a heat engine, the combination with piping having flow controlling means of an oil reservoir having a temperature responsive oil propulsive agency connected therewith, said vessel being mounted to subject said agency to heat from the engine, and means to regulate the application of heat to said agency by said engine, to cause a greater heat application with lower atmospheric temperatures.

55. A lubricating system comprising a reservoir, a branched conduit having an inlet at said reservoir and adapted to receive oil therefrom and having a plurality of outlets and a check valve at the inlet, said branched conduit having an air pocket arranged in heat conducting relation with the exhaust manifold of an internal combustion engine, whereby oil will be discharged from said system when it is heated and sucked into said system when the system is cooled due to expansion and contraction of the air respectively.

56. In a lubricating system, a vented supply reservoir, having an outlet, an outwardly opening check valve controlling said outlet, a distributing conduit arranged to emit lubricant upon heating and to receive lubricant from said reservoir through said check valve upon suction occasioned by subsequent cooling of a gaseous medium contained therein and float means for yieldably holding said check valve in closed position.

57. A chassis lubricating installation for an automotive vehicle comprising an exhaust manifold attached to the actuating engine thereof, said installation comprising a piping system having flow controlling outlets to the chassis bearings and means for utilizing the heating effect of the exhaust gases in the exhaust manifold for the propulsion of lubricant through the outlets to the bearings, said means comprising a lubricant reservoir containing air and oil, located in heat exchange relationship with the exhaust gases in the exhaust manifold, whereby upon thermal expansion of said air under the influence of the heat from said exhaust gases pressure will be exerted against the lubricant in said reservoir forcing it into said piping system.

58. A central lubricating installation for a machine comprising a central reservoir, a central source of pressure receiving lubricant from said reservoir, said source including an oil and air containing receptacle and means to cause an increase in pressure of said air incidental to starting of operation of said machine, a piping distributing system receiving lubricant under pressure from said source, said system comprising an inlet, and flow controlling outlets, said fittings each comprising a length of pipe having restriction wicking therein, each of said fittings having a calibration mark designating the relative rates of emission thereof, said source of pressure being adapted to exert sufficient pressure upon the lubricant to cause gradual seepage of lubricant outwardly through said restriction wickings and said wickings having such high restriction so as to permit only a gradual decrease in said pressure.

59. A central chassis lubricating system for the spaced chassis bearings of an automobile vehicle provided with an internal combustion engine operating the vehicle, said installation comprising a central lubricant supply and pressure source and a distributing piping system leading to the bearings to be lubricated with flow controlling outlets, said system having means to prevent return flow through the piping system into the supply, said source being provided with means actuated only upon and for a period subsequent to initiation of the operation of the vehicle to create a lubricant propulsive pressure for moving lubricant through said system and its outlets, said pressure being diminished by said propulsion until it substantially decreases, whereupon lubricant propulsion will cease until the vehicle is stopped and subsequently again initiated into operation, whereby pressure will again be created and propulsion of lubricant will result, said system being provided with means to prolong the duration of the lubricant propulsion after each initiation of the operation of the vehicle, said last mentioned means consisting in part of an inertia operated valve between said source and said system to retard propulsion and to permit it only during the road movement of the vehicle and also consisting in part of elongated capillary wicking members in said piping system to retard propulsion and permit only capillary flow under pressure through said system.

60. In a chassis lubricating system of the type including a source of lubricant and distributing piping supplied therefrom, having highly restricted flow controlling outlets open from end to end; the combination therewith of propulsive means for the lubricant, said propulsive means comprising a closed chamber having a part thereof filled with a heat expansive permanently gaseous fluid and the remaining part filled with lubricant in direct contact with said fluid, said chamber being in heat interchange relation with a hot portion of the engine and said fluid upon expansion serving to apply propulsive force to lubricant in said chamber, and means in advance of said piping operated by the suction due to contraction of said expansive fluid when cooled, permitting lubricant from said source to be drawn into the closed chamber to satisfy said consequent vacuum.

61. In an automatic chassis lubricating system, the combination of a lubricant supply reservoir, an expansive fluid medium for propelling lubricant from said reservoir, an exhaust heating said fluid medium to create a pressure and thereby to propel said lubricant and a plurality of valve means, one to vent fluid medium from said reservoir to prevent creation of too high a pressure in said reservoir by reason of the heating of said medium and another to admit fluid medium to said reservoir to fill the volume left void by the propelled lubricant when the medium cools.

62. A supply installation for a chassis lubricating system of the pressure type, said installation comprising an oil reservoir, an outlet pipe therefrom leading to the distributing system, and lubricant propulsive means comprising a conduit tapped into said outlet pipe, said conduit being provided with a trap containing air, and a hollow collar at the upper end of said conduit to encircle the engine exhaust, whereby the expansion of the air in the trap in said conduit during operation of the engine will cause propulsion of lubricant from said pipe, and a check valve to prevent return of lubricant from said pipe to said reservoir.

63. In a central chassis lubricating system, the combination of a reservoir having oil and air therein, the top of said reservoir having means for a heat exchange connection including a metallic attachment thereof to an exhaust manifold, an outlet connection from said reservoir from the bottom thereof including a non-return check valve to prevent return of lubricant to said reservoir, and control instrumentalities in the top of said reservoir laterally of said attachment means, said instrumentalities including a safety valve unit and an air inlet valve unit, the former preventing too great a pressure being obtained on heating of the air and the latter permitting air to be drawn in upon cooling of the air.

64. In a chassis lubricating system, the combination of a pipe in intimate heat exchange relation with the engine exhaust, said pipe having an oil inlet and an oil outlet at parts thereof remote from said engine exhaust, said outlet including a non-return check valve to prevent return flow of lubricant, lubricant distributing piping connected to said outlet, and a check valve to automatically maintain closed said oil inlet during application of the expansive force due to heating of the air in said pipe, said air contacting directly with said lubricant.

JOSEPH BIJUR.